(12) United States Patent
Greene et al.

(10) Patent No.: US 8,482,766 B2
(45) Date of Patent: Jul. 9, 2013

(54) AUTOMATIC ADJUSTMENT PRINT JOB SUBMISSION MECHANISM

(75) Inventors: Edwin Greene, Loveland, CO (US); Leonard Corning Lahey, Boulder, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 934 days.

(21) Appl. No.: 12/350,583

(22) Filed: Jan. 8, 2009

(65) Prior Publication Data

US 2010/0171976 A1  Jul. 8, 2010

(51) Int. Cl.
*G06K 15/00* (2006.01)
*G06F 3/12* (2006.01)

(52) U.S. Cl.
USPC .................................. 358/1.15; 358/1.14

(58) Field of Classification Search
USPC ............................... 358/1.15, 1.14
See application file for complete search history.

(56) References Cited

U.S. PATENT DOCUMENTS

| 7,123,848 | B2 | 10/2006 | Clement et al. |
| 2003/0221133 | A1 | 11/2003 | Nguyen et al. |
| 2005/0190383 | A1* | 9/2005 | Levin et al. ............ 358/1.1 |
| 2006/0193006 | A1 | 8/2006 | Lawrence et al. |
| 2006/0271692 | A1* | 11/2006 | Kruse et al. ............ 709/229 |
| 2007/0044101 | A1 | 2/2007 | Suzuki et al. |
| 2007/0165266 | A1 | 7/2007 | Tian |
| 2007/0206216 | A1 | 9/2007 | Sakagami |
| 2007/0268519 | A1 | 11/2007 | Appercel |
| 2008/0239368 | A1* | 10/2008 | Ota ............................. 358/1.15 |

* cited by examiner

*Primary Examiner* — Twyler Haskins
*Assistant Examiner* — Fred Guillermety
(74) *Attorney, Agent, or Firm* — Blakely, Sokoloff, Taylor & Zafman LLP

(57) ABSTRACT

A method disclosed. The method includes a print application determining if capacity is available at a print server to receive print jobs in a print job queue, analyzing the characteristics of the print jobs in the print job queue if there is no capacity available at the print server to receive the print jobs and automatically prioritizing the print jobs in the print job queue based upon the characteristics.

17 Claims, 5 Drawing Sheets

AUTOMATIC ADJUSTMENT PRINT JOB SUBMISSION MECHANISM

FIELD OF THE INVENTION

The invention relates to the field of computer systems, and in particular, to upgrading printing software products.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer.

Once a connection is established between a workstation and the printer, printing software is implemented at a print server to manage a print job from order entry and management through the complete printing process. However, the printing software may often suffer from decreased productivity as a result of users overloading the system with too many print jobs.

A solution to this overloading problem is to train customers as to how to properly use the system in order to increase the number of knowledgeable system operators. However, some customers may choose not to expend the time and resources necessary to train their personnel. Further, personnel turnover may make retraining necessary.

Accordingly, a mechanism to automatically submit print jobs is desired.

SUMMARY

In one embodiment, a method includes a print application determining if capacity is available at a print server to receive print jobs in a print job queue, analyzing the characteristics of the print jobs in the print job queue if there is no capacity available at the print server to receive the print jobs and automatically prioritizing the print jobs in the print job queue based upon the characteristics.

Another embodiment discloses a print application having a print queue to store a plurality of print jobs to be transmitted for printing, a graphical user interface to enter the print jobs and a print application to analyze the characteristics of the print jobs in the print job queue if there is no capacity available at the print server to receive the print jobs and to automatically prioritize the print jobs in the print job queue based upon the characteristics.

A further embodiment discloses an article of manufacture comprising a machine-readable medium including data that, when accessed by a machine, cause the machine to perform operations comprising determining if capacity is available at a print server to receive print jobs in a print job queue, analyzing the characteristics of the print jobs in the print job queue if there is no capacity available at the print server to receive the print jobs and automatically prioritizing the print jobs in the print job queue based upon the characteristics.

BRIEF DESCRIPTION OF THE DRAWINGS

A better understanding of the present invention can be obtained from the following detailed description in conjunction with the following drawings, in which.

DETAILED DESCRIPTION

A print job submission mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
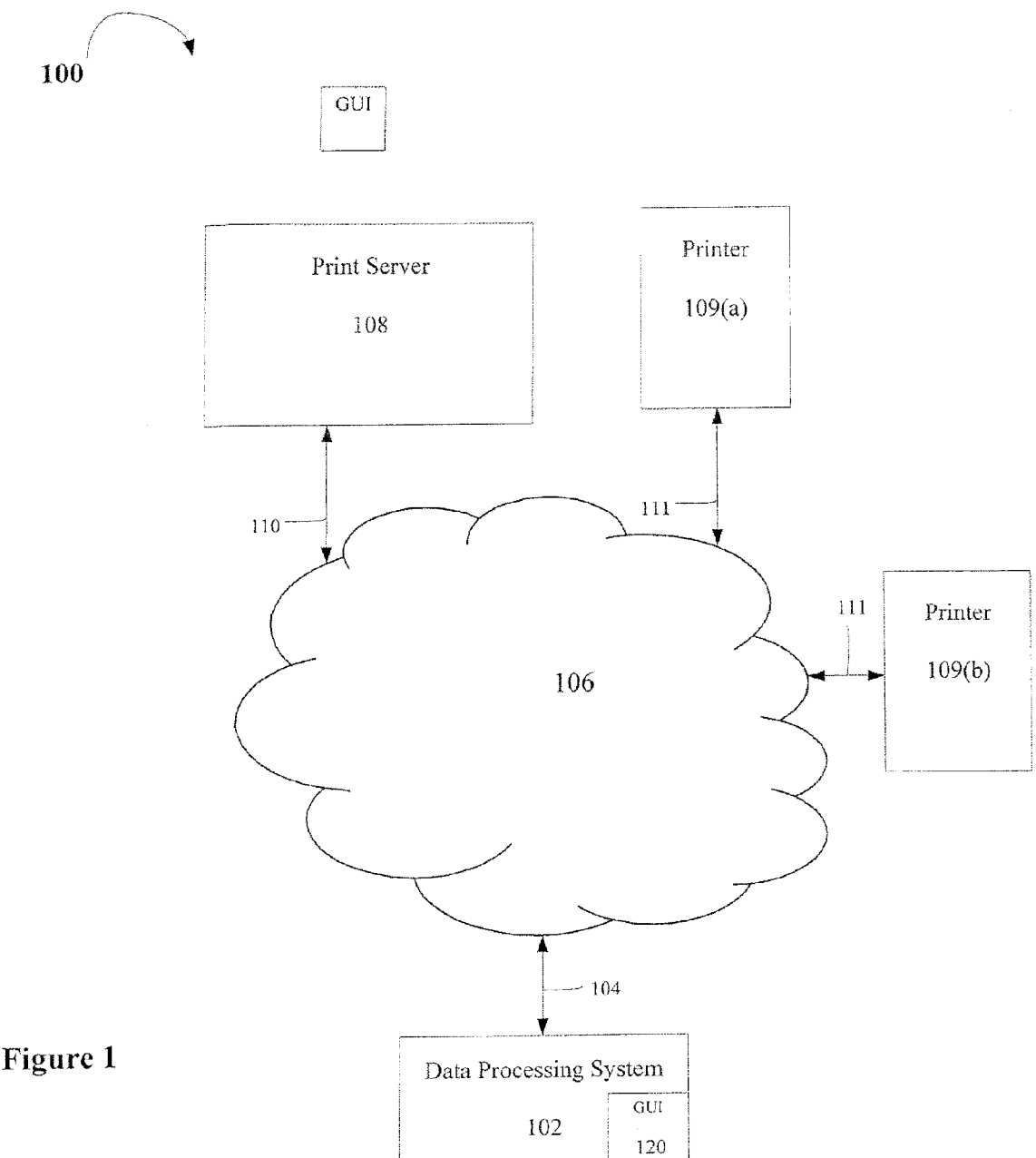
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system or a similar operating system and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server 108 that serves print requests over network 106 received via communications link 110 between print server 108 and network 106. Print server 108 subsequently transmits the print requests via communications link 110 to one of printers 109 for printing, which are coupled to network 106 via communications links 111.

In one embodiment, the operating system on data processing system 102 allows a user to select the desired print server 108 and submit requests for service requests to printer 109 via print server 108 over network 106. In a further embodiment, print server 108 includes a print queue for print jobs requested by remote data processing systems.

Although described as separate entities, other embodiments may include print server 108 being incorporated in one or more of the printers 109. However in other embodiments, the print server and printer may be physically separate entities. Therefore, the data processing system network depicted in FIG. 1 is selected for the purposes of explaining and illustrating the present invention and is not intended to imply architectural limitations. Those skilled in the art will recognize that various additional components may be utilized in conjunction with the present invention.

According to one embodiment, print server 108 implements a printing software product that manages the printing of documents from data processing system 102 between data processing system 102 and one or more of printers 109. In other embodiments, the printing software manages printing of documents from multiple data processing systems 102 to the one or more printers 109.

According to one embodiment, the printing software product may be implemented using either InfoPrint Manager (IPM) or Infoprint ProcessDirector (IPPD), although other types of printing software may be used instead. In a further embodiment, data processing system 102 includes a print application that interacts with the printing software at printer server 108 to provide for efficient transmission of print jobs.

Figure 2:
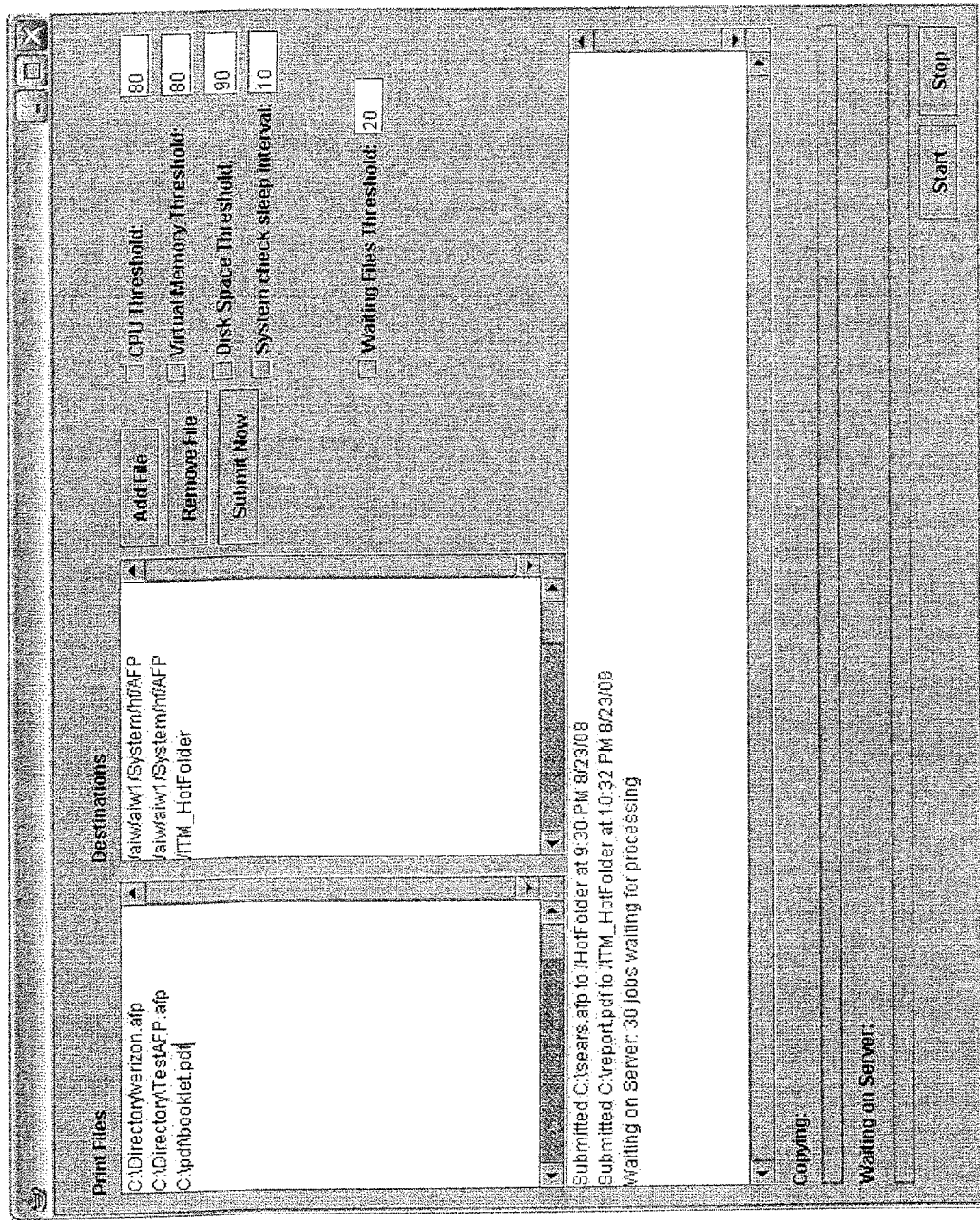
FIG. 2 is a screen shot of one embodiment of a graphical user interface.

In one embodiment, the print application includes a graphical user interface (GUI) 120 that enables a system administrator (or operator) to interact with the print application. FIG. 2 is a screen shot of one embodiment of GUI 120. According to one embodiment, an operator at data processing system 102 implements GUI 120 to automatically submit print jobs to the printing software product at printer server 108.

In such an embodiment, the operator uses GUI 120 to add print jobs to a print queue. As shown in FIG. 2, GUI 120 includes a Print Files entry, which includes files selected to be printed, along with a Destination entry indicating which target each respective file is to be printed. The Destination entry may be an entry point from which print server 108 accepts the print job. Once a print job is placed at this Destination, it is assumed that the print server has accepted that work and that the workload of print server 108 has increased by the amount associated with that print job.

In one embodiment, the print application determines when the print jobs are to be submitted to printer server 108 based on certain criteria. Such criteria may include the number of print jobs being processed already, processor utilization, virtual memory resources, etc.).

According to one embodiment, the print application analyzes the print jobs in the queue to automatically prioritize them based on a current system state whenever not submitting print jobs. Alternatively, the print application may enter a sleep mode whenever not submitting print jobs.

Figure 3:
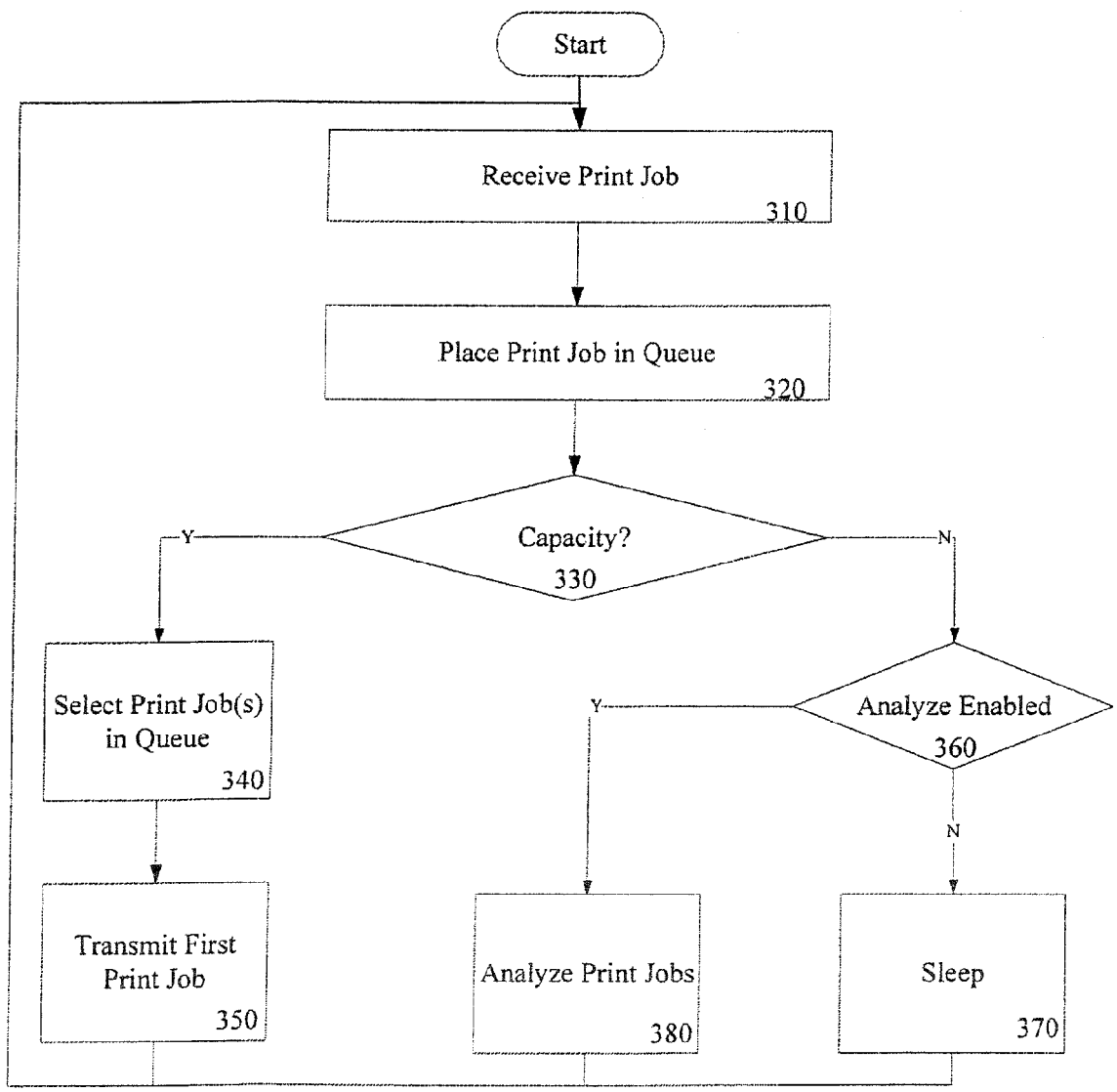
FIG. 3 is a flow diagram illustrating one embodiment of submitting a print job.

FIG. 3 is a flow diagram illustrating one embodiment of the operation of the print application submitting a print job. At processing block 310, a print job added by the operator via GUI 120 is received at the print application. At processing block 320, the print job is added to a queue. At decision block 330, it is determined whether capacity (e.g., disk space) is available at print server 108 for one or more of the print jobs in the queue. In one embodiment, the print application queries the printing software to determine the capacity.

If the printing software has capacity, one or more print jobs in the queue are selected for transmission to print server 108, processing block 340. In one embodiment, the print jobs may be selected based upon a first in first out (FIFO), last in first out (LIFO) prioritization scheme. However other priority schemes (e.g., file size) may be implemented. At processing block 350, the selected print job is transmitted to print server 108. Subsequently, an entry is written into a log to track the print job.

If it is determined that the printing software does not currently have the capacity to receive a print job, it is determined whether print application has an Analyze Print Jobs feature activated, decision block 360. If not, the print application enters the sleep mode, processing block 370. In one embodiment, the sleep length is determined by on the previously queried printing software capacity. Otherwise, the Analyze Print Jobs function is performed, processing block 380.

The Analyze Print Jobs function analyzes characteristics for the print jobs in the queue for automatic job prioritization. For instance, the function may determine which print jobs will require light processing and which jobs will require heavy processing, and assigns priority based on current workload level.

According to one embodiment, the operator sets a value (WorkThreshold) that establishes a level of workload for the print application, while a (Work) value represent a number of print jobs being processed in a prepare phase or a number of jobs queued for a processing task. PotentialWork is measured by the difference between the WorkThreshold value and the Work value.

Figure 4:
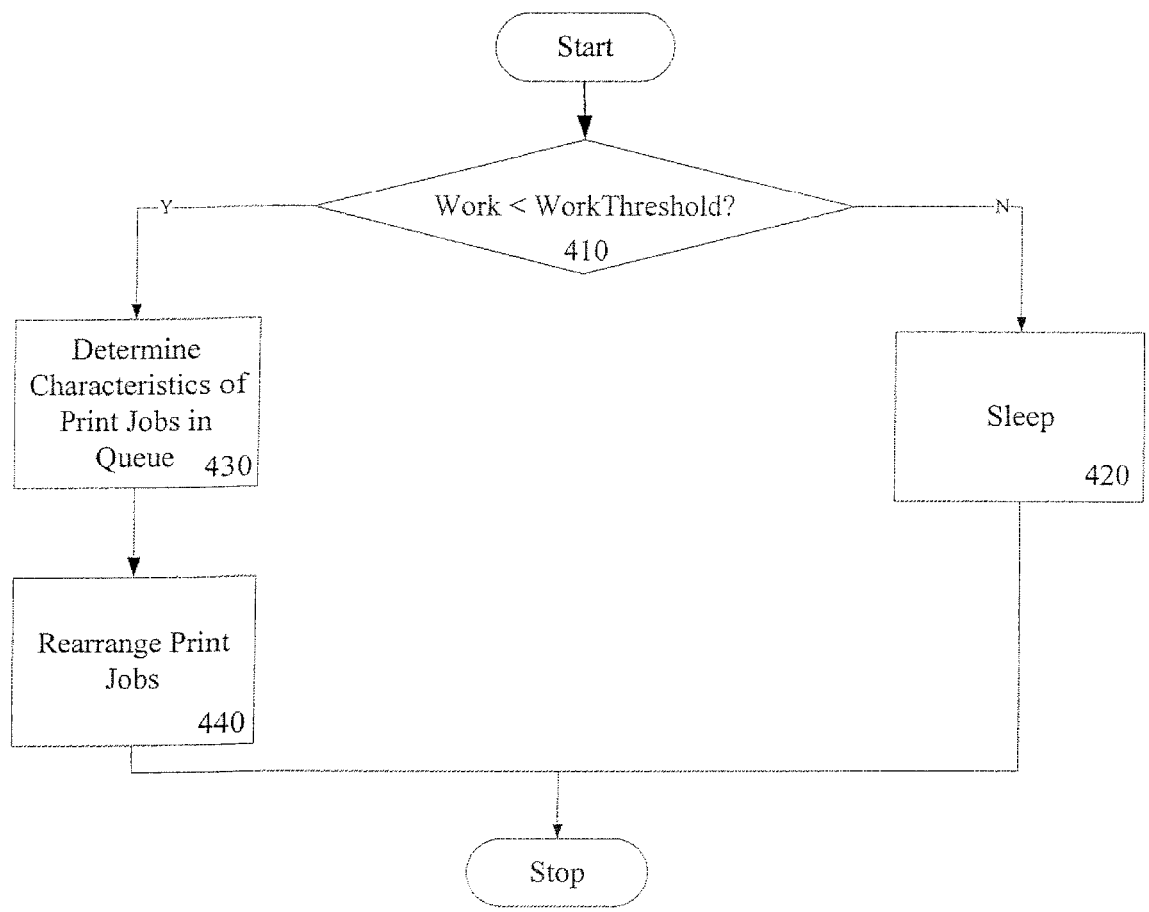
FIG. 4 is a flow diagram illustrating another embodiment of submitting a print job.

FIG. 4 is a flow diagram illustrating one embodiment of the operation of the Analyze Print Jobs function. At decision block 410, it is determined whether the print application has potential to accept additional work (e.g., Work<WorkThreshold). If there is no potential to accept additional work, the print application enters the sleep mode, processing block 420. In one embodiment, the sleep length depends on the printing software capacity and PotentialWork, whichever yields the shorter sleep duration.

If there is potential to accept additional work, the print application determine characteristics of the print jobs in the queue by estimating the workload for a job, processing block 430. In one embodiment, simple print job types are determined to have low workloads, while complex print jobs (e.g., those performing transform/Sort-Split/Index) are determined to have potentially high workloads). At processing block 440, the print jobs in the queue are rearranged based on the print jobs that best match the current availability for the next submission.

In a further embodiment, the characteristics of the print job used for prioritization are based on user designed criterion. For example, the operator may add a print job to the print queue via GUI 120, select the print job and then modify its characteristics, providing additional characteristics that are unavailable to the print application. For example, characteristics that are available to the application are the size of the job (as in, the disk size in bytes), but the characteristic of the print job that indicates that it needs to be separated into documents and indexed (functions of InfoPrint Solutions DocPool software and Advanced Function Printing (AFP) Indexer software) is not something that the print application will have an inherent knowledge of. In this instance, the operator modifies the characteristics of the job and adds to its workload "weight", indicating that it will require a greater amount of work then the application would suspect based on file size alone.

A problem may occur in the above-described Analyze Print Jobs function where the threshold value may be incorrectly set. An incorrect threshold value my cause data processing system network 100 (print server, printers, etc) to be underutilized, or given too much work, resulting in inefficient network 100 performance. For example, when submitting print jobs to print server 108, it can be hard to determine how much work (the number of print jobs and other process) the printing software can handle to produce the greatest level of performance.

As discussed above, the operator sets the threshold value WorkThreshold. Depending on the changing work environment and job properties, print server 108 and printers 109 could become under utilized by a threshold that is too low. On the other hand, the operator could set the threshold higher, only to have another change in the job/network 100 cause print server 108 to become overloaded.

Sleeping when the threshold is exceeded prevents the system from being overloaded, but does not prevent the system from being underutilized. Further, once a sleep has been triggered by exceeded the threshold limit, the system is already overloaded. Sleep is a reaction to too much work, not a preventative measure to keep the system from being overloaded.

According to one embodiment, an AutoThresholding mechanism enables print server 108 to communicate the number of jobs it was able to print over a certain time interval (as set by the operator). Subsequently, the AutoThresholding mechanism changes the threshold of the print application. In such an embodiment, the threshold is increased if print server 108 is able to handle more work, or decreasing the threshold if print server 108 was unable to print the number of jobs specified by the original threshold.

In one embodiment, WorkThreshold starts out at an initial value (e.g., 20) and print jobs are continuously submitted to the printing software, without pause, for one minute. Next, the print application checks to determine how many print jobs were actually printed after the minute and then adjusts the Threshold. If print server 108 is performing at a level below WorkThreshold, the AutoThresholding mechanism calculates the percentage below the WorkThreshold. Subsequently, the AutoThresholding mechanism acquires the average value between the estimated performance and the actual performance, and then sets the WorkThreshold to the new lower value.

Consider the following example where WorkThreshold is set to 20 jobs; duration is set to 1 minute; and after 1 minute only 10 jobs are completed. The New Threshold=OldThreshold*(CompletedJobs/OldThreshold+((1−CompletedJobs/OldThreshold)/2)). Thus WorkThreshold=20 (10/20+((1−10/20)/2)=20 (0.75)=15. If the next results are: WorkThreshold: 15, Completed Jobs: 10, the new Threshold will be 12.5. The WorkThreshold will continue to be refined closer and closer to the actual number of completed print jobs.

In a further embodiment, the AutoThresholding mechanism also modifies the sleep settings. If the WorkThreshold is increased, the amount of time slept between submitting jobs can be decreased. Similarly, if the WorkThreshold is decreased, the sleep time can be increased. As the print jobs printed per duration increases, the sleep time decreases according to the percentage of jobs printed over the WorkThreshold. As the jobs printed per duration decreases, the sleep time increases according to the deficit percentage divided by two. In one embodiment, the deficit percentage is divided by two to "tune" the mechanism toward always testing the print server 108 and attempting to print more).

Figure 5:
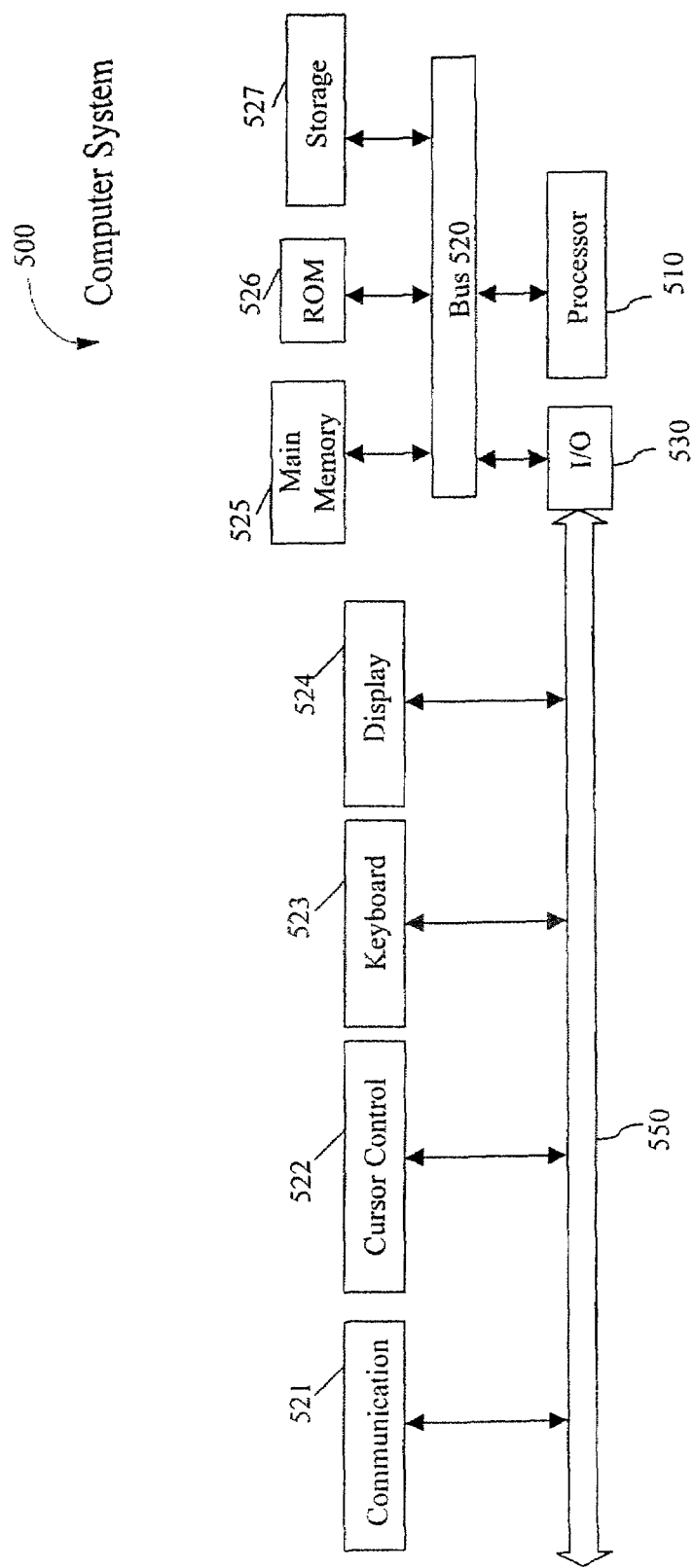
FIG. 5 illustrates one embodiment of a computer system.

FIG. 5 illustrates a computer system 500 on which data processing system 102 and/or server 108 may be implemented. Computer system 500 includes a system bus 520 for communicating information, and a processor 510 coupled to bus 520 for processing information.

Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and or other static storage device 526 coupled to bus 520 for storing static information and instructions used by processor 510.

A data storage device 525 such as a magnetic disk or optical disc and its corresponding drive may also be coupled to computer system 500 for storing information and instructions. Computer system 400 can also be coupled to a second I/O bus 550 via an I/O interface 530. A plurality of I/O devices may be coupled to I/O bus 550, including a display device 524, an input device (e.g., an alphanumeric input device 523 and or a cursor control device 522). The communication device 521 is for accessing other computers (servers or clients). The communication device 421 may comprise a modem, a network interface card, or other well-known interface device, such as those used for coupling to Ethernet, token ring, or other types of networks.

The above-described mechanism keeps productivity hindering jobs from a server until the server has the capacity to process the jobs, keeps each printer continually occupied with no idle cycles and analyzes queued print jobs and reprioritize them based off of the type of job and the current status of the system Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A print client, comprising:
   memory device to store:
   a print queue having a plurality of print jobs to be transmitted for printing;
   a graphical user interface;
   a print application; and
   a processor to execute the print application having an automatic threshold mechanism to receive data from a print server and using the data to automatically adjust a threshold for a number of print jobs to transmit to the print server during a time interval, wherein the data received from the server indicates a number of print jobs the print server printed during a time interval.

2. The print client of claim 1 wherein the print application increases the threshold if the number of print jobs the print server printed during the time interval is greater than the threshold.

3. The print client of claim 1 wherein the print application decreases the threshold if the number of print jobs the print server printed during the time interval is less than the threshold.

4. The print client of claim 3 wherein the print application calculates a percentage of which the print serving is performing below the threshold.

5. The print client of claim 4 further comprising wherein the print application adjusts the threshold according to the calculated percentage.

6. An article of manufacture comprising a non-transitory machine-readable medium including data that, when accessed by a machine, cause the machine to perform operations comprising:
receiving data from a print server; and
automatically adjusting a threshold for a number of print jobs to transmit to the print server during a time interval based on the data received from the print server, wherein the data received from the server indicates a number of print jobs the print server printed during a time interval.

7. The article of manufacture of claim 6, wherein the machine-readable medium includes data that causes the machine to perform further operations comprising increasing the threshold if the number of print jobs the print server printed during the time interval is greater than the threshold.

8. The article of manufacture of claim 6, wherein the machine-readable medium includes data that causes the machine to perform further operations comprising decreasing the threshold if the number of print jobs the print server printed during the time interval is less than the threshold.

9. The article of manufacture of claim 8 wherein the machine-readable medium includes data that causes the machine to perform further operations comprising calculating a percentage of which the print serving is performing below the threshold.

10. The article of manufacture of claim 9, wherein the machine-readable medium includes data that causes the machine to perform further operations comprising adjusting the threshold according to the calculated percentage.

11. The article of manufacture of claim 6 wherein the machine-readable medium includes data that causes the machine to perform further operations comprising adjusting sleep settings according to the adjusted threshold.

12. The article of manufacture of claim 11 wherein an amount of time slept between submitting jobs is decreased upon increasing the threshold and is increased upon decreasing the threshold.

13. A system comprising:
a print server; and
a print client, communicatively coupled to the print server, having:
a print queue to store a plurality of print jobs to be transmitted for printing;
a graphical user interface to enter the print jobs; and
a print application having an automatic threshold mechanism to receive data from the print server and using the data to automatically adjust a threshold for a number of print jobs to transmit to the print server during a time interval, wherein the data received from the server indicates a number of print jobs the print server printed during a time interval.

14. The system of claim 13 wherein the print application increases the threshold if the number of print jobs the print server printed during the time interval is greater than the threshold.

15. The system of claim 13 wherein the print application decreases the threshold if the number of print jobs the print server printed during the time interval is less than the threshold.

16. The system of claim 15 wherein the print application calculates a percentage of which the print serving is performing below the threshold.

17. The print client of claim 15 wherein the print application adjusts the threshold according to the calculated percentage.

* * * * *